June 8, 1965  A. W. VASEL ETAL  3,188,593
DETECTOR ASSEMBLY
Filed Oct. 10, 1962  2 Sheets-Sheet 1

*Inventors*
Alfred W. Vasel
Rudolph W. Kalns
By their Attorney
Robert E. Ross

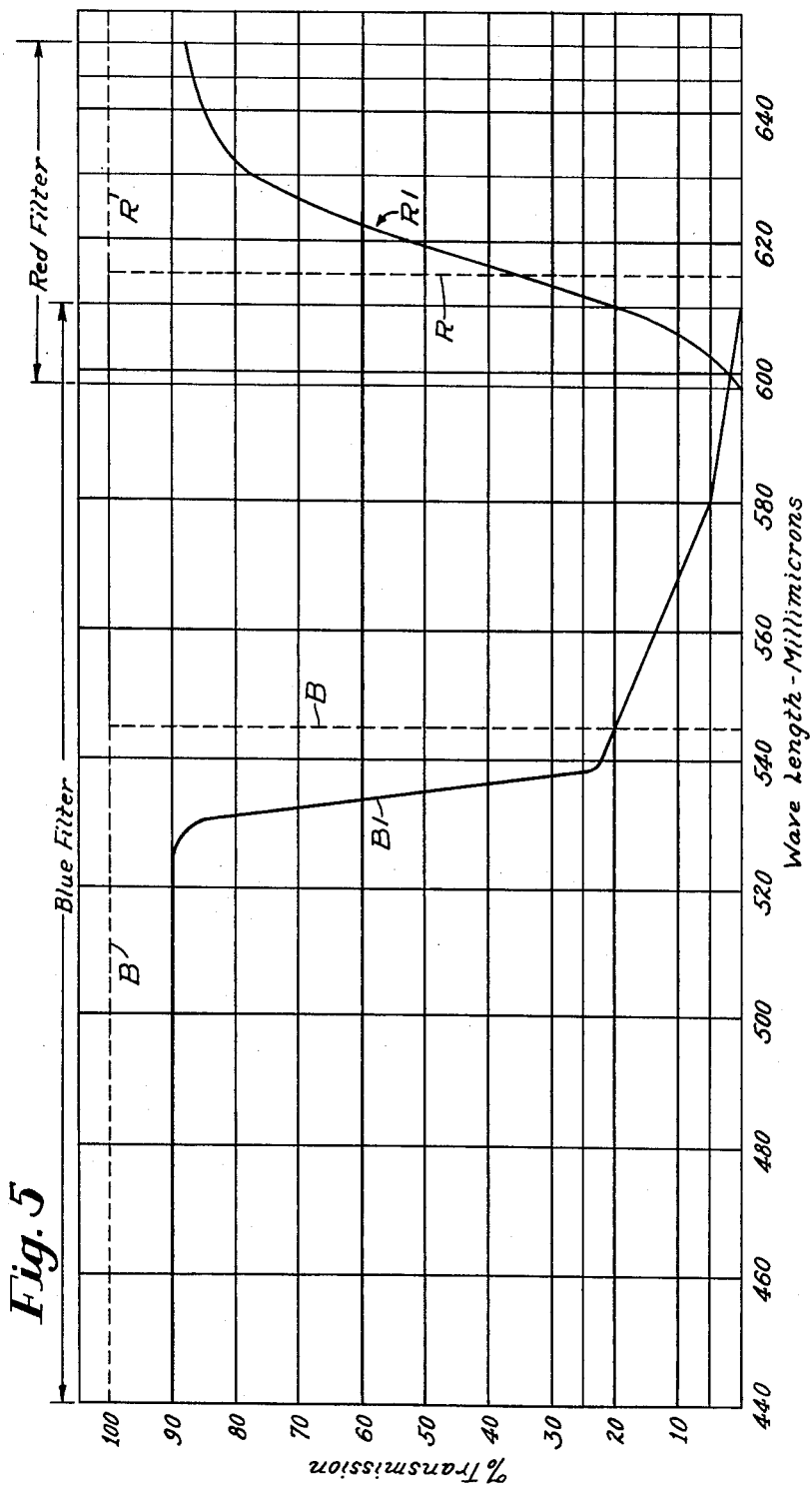

United States Patent Office 3,188,593
Patented June 8, 1965

3,188,593
DETECTOR ASSEMBLY
Alfred W. Vasel, 222 Linwood St., Abington, Mass., and Rudolph W. Kalns, Weymouth, Mass. (21 Mason St., East Weymouth, Mass.)
Filed Oct. 10, 1962, Ser. No. 229,586
4 Claims. (Cl. 338—18)

This invention relates generally to apparatus for detecting radiant light in a particular frequency band, and has particular reference to a fire detecting apparatus which is capable of distinguishing between flame and other sources of light containing infra-red.

In a co-pending application Serial No. 788,318, filed January 22, 1959, by one of the present inventors, Alfred W. Vasel and Donald F. Steele there is disclosed apparatus for the above described purpose, comprising series connected detecting units, one of which is primarily responsive, by a decrease in resistance, to light in the red to infra-red band, the other being primarily responsive, by a decrease in resistance, to light in the blue band. The system as described therein utilizes detecting cells of two different materials, such as polycrystalline cadmium sulfide and mono-crystalline cadmium sulfide. When a voltage is applied across the series connected cells and a detector unit connected to the junction, the relative resistance change of the cells when exposed to various types of radiation is such that the junction voltage is high enough to actuate the detector only when exposed to the radiation of a fire.

Although the apparatus described in the above identified application operates satisfactorily and reliably, the necessity for utilizing a detector of two different materials is inconvenient and expensive, and requires that the electrical characteristics of the two portions be carefully matched.

The object of this invention is to provide a detection unit for the purpose described in which a single detection material serves to respond to light in both the blue and the red to infra-red band.

A further object of the invention is to provide a detector unit for the purpose described in which filter means responsive to different light frequency bands is disposed over different portions of a detector material.

Other objects of the invention will be apparent to one skilled in the art from the following detailed description of a specific embodiment thereof.

In the drawing:

FIG. 5 is a graph illustrating the actual and ideal response curves of the detector element portions.

Figure 1:
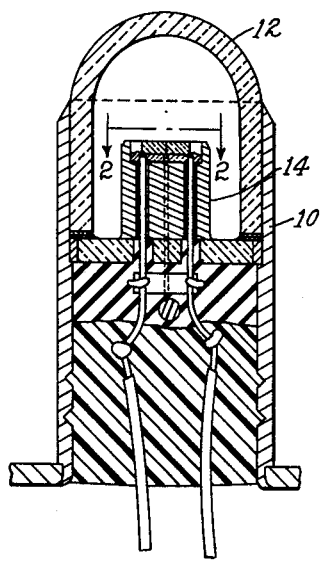
FIG. 1 is a view in side elevation, partly in section, illustrating a detector element embodying the features of the invention.
Figure 2:
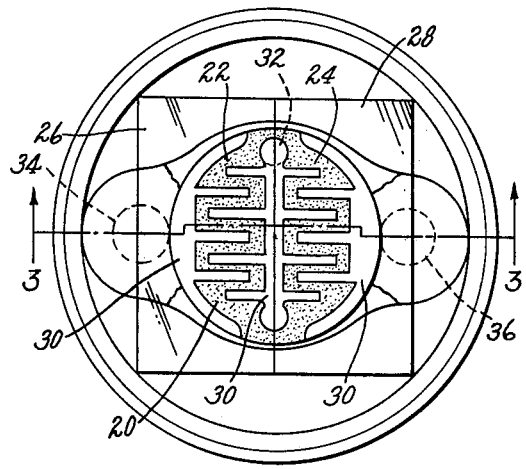
FIG. 2 is an enlarged view in section taken on line 2—2 of FIG. 1.

Referring to the drawing, there is illustrated a detector element which comprises generally a housing 10 having a translucent dome 12 disposed on the upper end thereof. Disposed within the housing is a cell support member 14 which projects upwardly toward the top of the dome, and having a recess 16 in the upper end thereof. Disposed within the recess is a detector cell comprising a ceramic pellet 18 having photo-resistive material 20 disposed on the outer surface in a predetermined configuration, forming two spaced portions 22 and 24. Disposed over the photo-resistive material are filters 26 and 28 so positioned that filter 26 is disposed over the cell portion 22 and filter 28 is disposed over cell portion 24.

In the illustrated embodiment the filters 26 and 28 are formed of glass, plastic or other suitable material, with filter 26 being adapted to pass light in the red to infra-red band, without passing any substantial amount of light in the blue band, whereas filter 28 is adapted to pass light in the blue band, without passing any substantial amount of light in the red to infra-red band.

An ideal transmission curve for the filters is illustrated by the dotted lines R and B in FIGURE 5, where R represents the ideal transmission curve for filter 26, and B represents the ideal transmission curve for the filter 28. Although filters having the ideal transmission characteristics are not available commercially, filters are available which have characteristics near enough to the optimum to permit the manufacture of an operative device. For example, filter 26 may be formed of a filter glass manufactured by The Corning Glass Works of Corning, New York under the designation of No. 2030, and having light transmission characteristics illustrated by curve R1 in FIG. 5. Filter 28 may be formed of a filter glass manufactured by the Bausch & Lomb Inc. of Rochester, New York under the designation of No. 90–1–540 and having light transmission characteristics illustrated by curve B1 in FIG. 5.

In the illustrated embodiment the photo-resistive material 20 may be polycrystalline cadmium sulfide disposed in the form of a thin ribbon on the pellet 18 surrounded by conductive material 30 in the usual manner. Center lead 32 is disposed through the pellet in electrical contact with the portion of the conductive material disposed between the cell portions 22 and 24 and outer leads 34 and 36 are connected to the conductive material on the outside of the portions 22 and 24 respectively.

Figure 4:
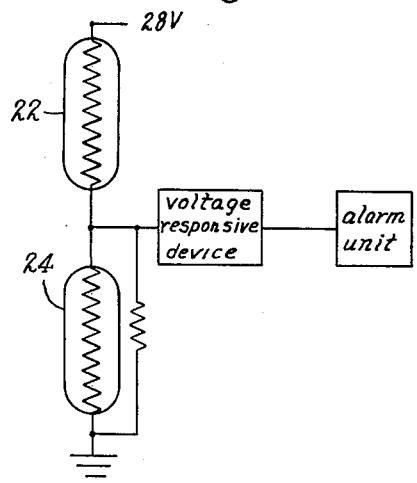
FIG. 4 is a circuit diagram illustrating a method of utilizing the detector element to actuate an alarm system.
Figure 3:
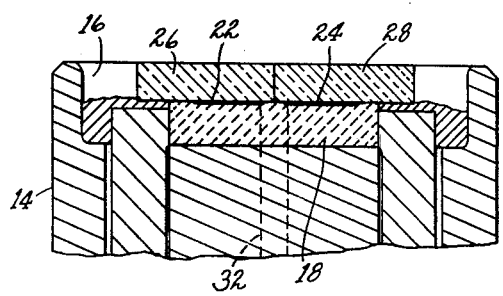
FIG. 3 is a view in section taken on line 3—3 of FIG. 2.

In operation, the detector may be associated with a voltage source, a voltage responsive device, and an alarm unit in the manner schematically illustrated in FIG. 4. Assuming that 28 volts are applied across the series connected cells, and the voltage responsive device being adapted to energize the alarm unit when about 14 volts or more appears at the junction of the cells, the following results are obtained when the detector cell is exposed to various light conditions.

| Light Source | Resistance Red Cell | Resistance Blue Cell | Junction Voltage |
|---|---|---|---|
| Dark | 500 meg | 500 meg | Neg. |
| Incandescent | 34K | 20K | 10.3. |
| Sunlight | 3K | 500 ohms | 4. |
| Fluorescent | 65K | 5K | 2. |
| Fire | 15K | 45K | 21. |

Thus it is seen that only when exposed to infra-red radiation containing very little blue light, such as is provided by a fire, does the relative resistance of the cell portions become such that sufficient voltage appears at the junction to actuate the alarm.

Although in the illustrated embodiment the red and blue portions of the detector are combined into a single unit, it will be apparent that in some cases separate detection elements may be used, one being sensitive to blue light, the other being sensitive to red light.

Since certain other obvious changes may be made in the device illustrated herein without departing from the scope of the invention, it is intended that all matter contained herein be interpreted in an illustrative and not a limiting sense.

We claim:

1. A fire detector assembly of the type described, comprising detector means responsive by a change in electrical properties to incident radiation, said means comprising two portions connected in series, said two portions being formed of the same type of material and each portion having a different filter associated therewith, each of said filters being adapted to transmit radiation of a different frequency band than the other, said portions and their associated filters being so associated that when viewing a space under surveillance, substantially the same radiation impinges on both filters.

2. A fire detector assembly of the type described, comprising a photo-resistive cell, said cell comprising two portions formed of the same type of photo-resistive material, said portions having a common junction at one electricial end and means for making an electricial connection to said junction and to the opposite electricial ends of said portions, and a different light filter disposed over each of said portions, the filter over one portion transmitting principally light above a predetermined frequency, the filter over the other portion transmitting principally light below said predetermined frequency, said cell portions and their associated filters being disposed closely adjacent each other, whereby substantially the same amount and type of radiation impinges on each filter.

3. A fire detector assembly as set forth in claim 2 in which one filter transmits principally light in the blue band and the other filter transmits light principally in the red to infra-red band.

4. A fire detector unit of the type described, comprising a support, photo-resistive material disposed on the surface thereof so as to provide two separate portions formed of the same type of photo-resistive material, a different light filter disposed over each of said portions, one of said filters transmitting principally light in the blue band, the other transmitting principally light in the infra-red band, said portions and their associated filters being closely associated on said support so that when viewing a space under surveillance, substantially the same type and amount of radiation impinges on both filters.

References Cited by the Examiner
UNITED STATES PATENTS

| | | | |
|---|---|---|---|
| 2,021,573 | 11/35 | Alder | 338—19 |
| 2,978,954 | 4/61 | Watson. | |
| 3,122,638 | 2/64 | Steele et al. | 338—18 |

RICHARD M. WOOD, *Primary Examiner.*